United States Patent [19]
Newman

[11] Patent Number: 5,833,166
[45] Date of Patent: Nov. 10, 1998

[54] STATOR COIL WINDING AND LEAD WIRE PLACING METHOD AND APPARATUS

[75] Inventor: Lawrence E. Newman, Tipp City, Ohio

[73] Assignee: Globe Products Inc., Huber Heights, Ohio

[21] Appl. No.: 686,268

[22] Filed: Jul. 25, 1996

[51] Int. Cl.⁶ .............................................. H02K 15/085
[52] U.S. Cl. .................................. 242/432.4; 242/432.6; 29/596; 29/605
[58] Field of Search ............................. 242/432.2, 432.3, 242/432.4, 432.5, 432.6; 29/596, 605

[56] References Cited

U.S. PATENT DOCUMENTS

| | | | |
|---|---|---|---|
| 3,334,825 | 8/1967 | Friedrich | 242/432.4 |
| 3,716,199 | 2/1973 | Ericson | 242/432.4 |
| 4,424,939 | 1/1984 | Ohashi et al. | 29/605 X |
| 5,090,108 | 2/1992 | Banner et al. | 29/596 |
| 5,535,503 | 7/1996 | Newman | 242/432.2 X |
| 5,586,383 | 12/1996 | Dolges et al. | 242/432.6 X |

FOREIGN PATENT DOCUMENTS 1381661  3/1988  U.S.S.R. .............................. 242/432.3

*Primary Examiner*—Donald P. Walsh
*Assistant Examiner*—Emmanuel M. Marcelo
*Attorney, Agent, or Firm*—Roger S. Dybvig

[57] ABSTRACT

When a stator start wire is held outwardly away from a stator pole piece as a stator coil is being wound, the segment of wire, termed the first end turn herein, extending from the outwardly-placed start wire across the front end face of a stator being wound may interfere with the proper formation of the coil. Such interference is reduced or eliminated by extending the first end turn over a movable slack wire forming blade. When the slack wire forming blade is initially engaged with the first end turn, it pivots with the front placing blade to move the start wire away from the pole piece and increase the length of the first end turn. After the coil is partially wound, the slack wire forming blade is moved away from engagement with the first end turn so that the first end turn becomes slack and, therefore, does not interfere with the completion of the winding or the coil.

7 Claims, 3 Drawing Sheets

FIG-1
(PRIOR ART)
FIG-3
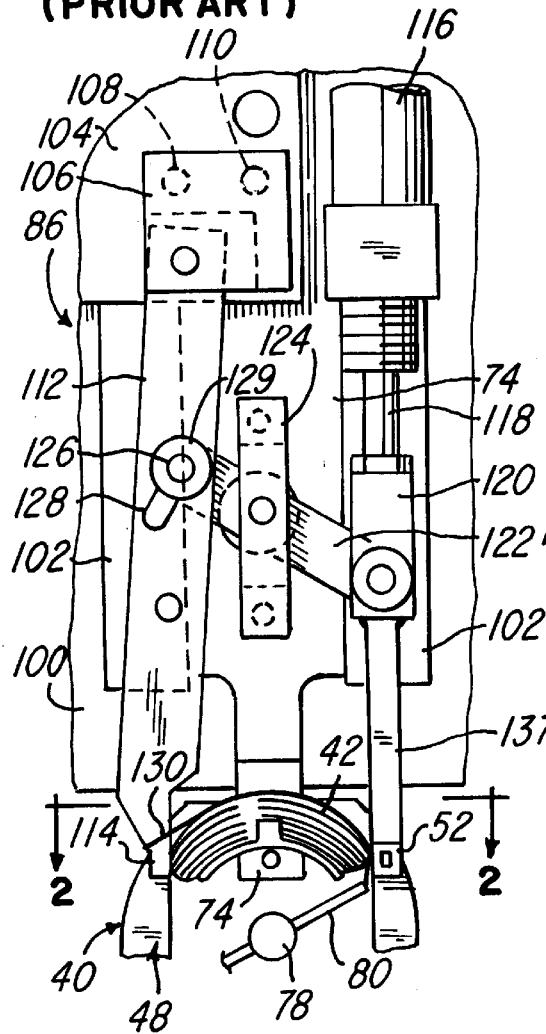
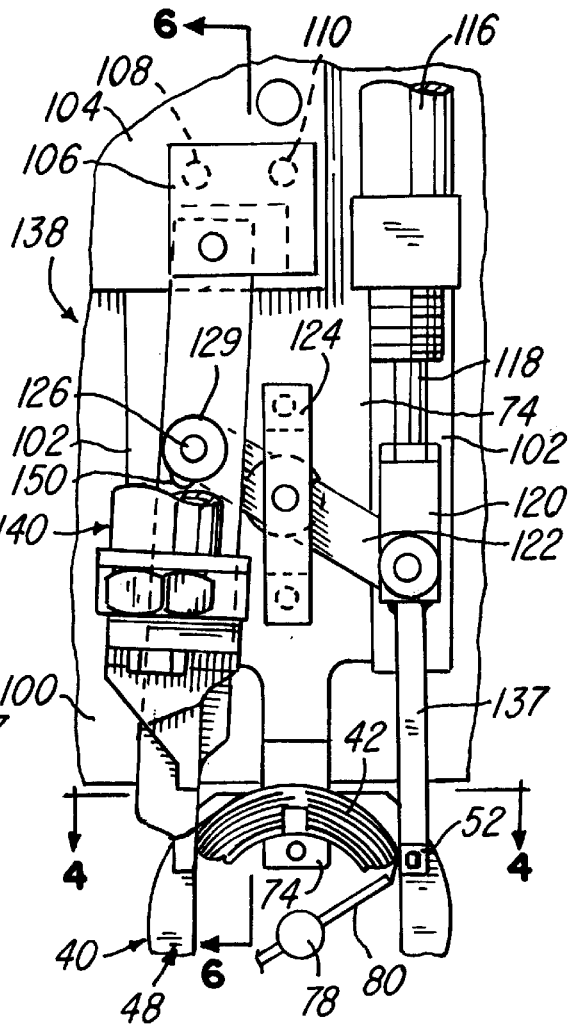
FIG-2
(PRIOR ART)
FIG-4
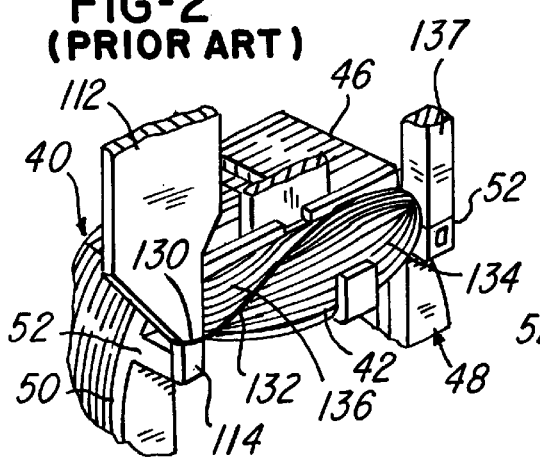
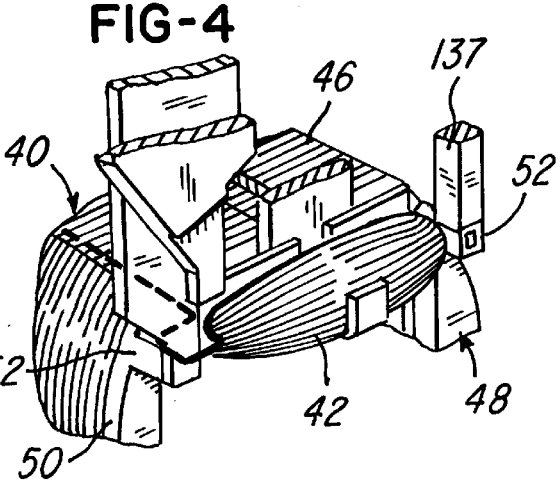

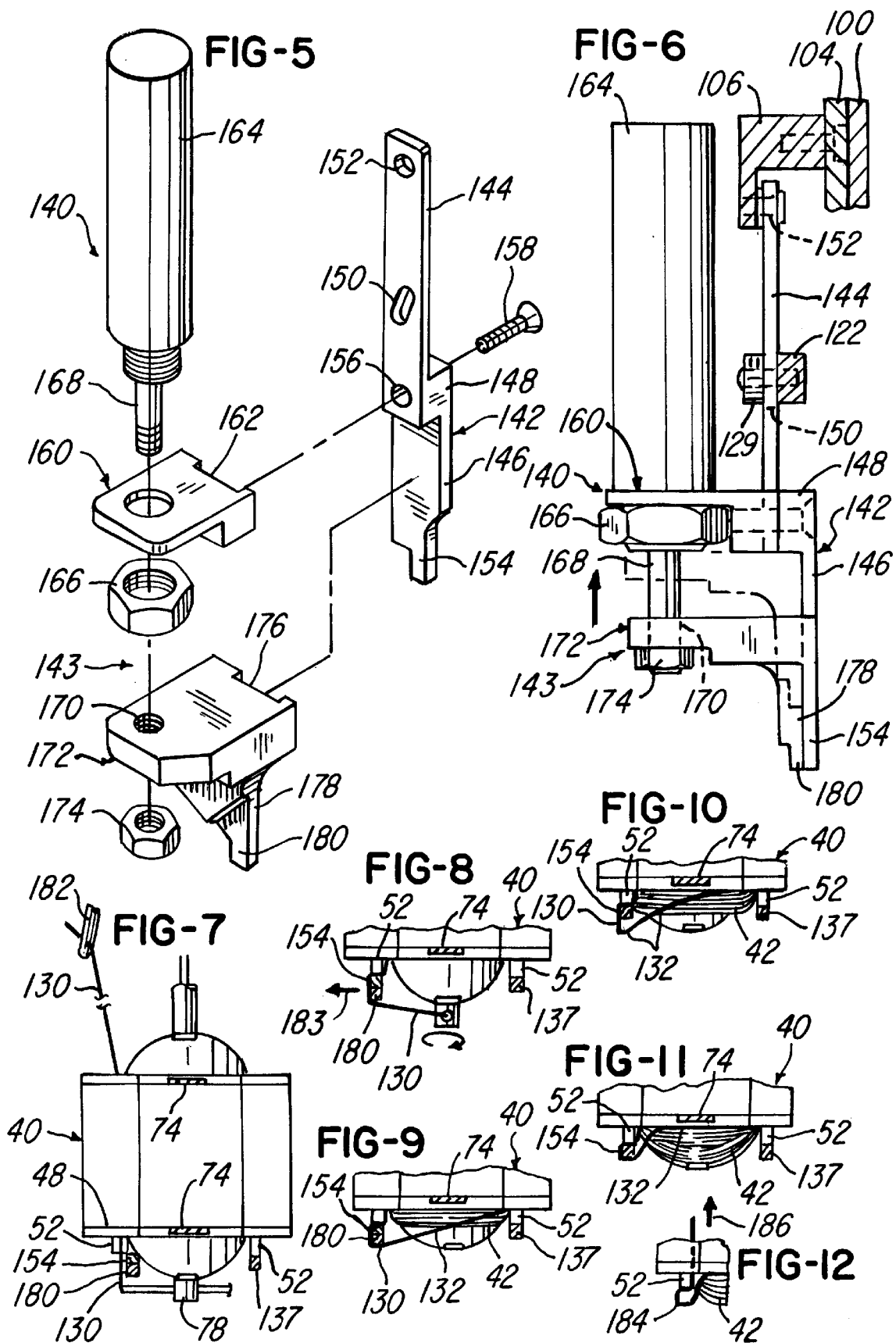

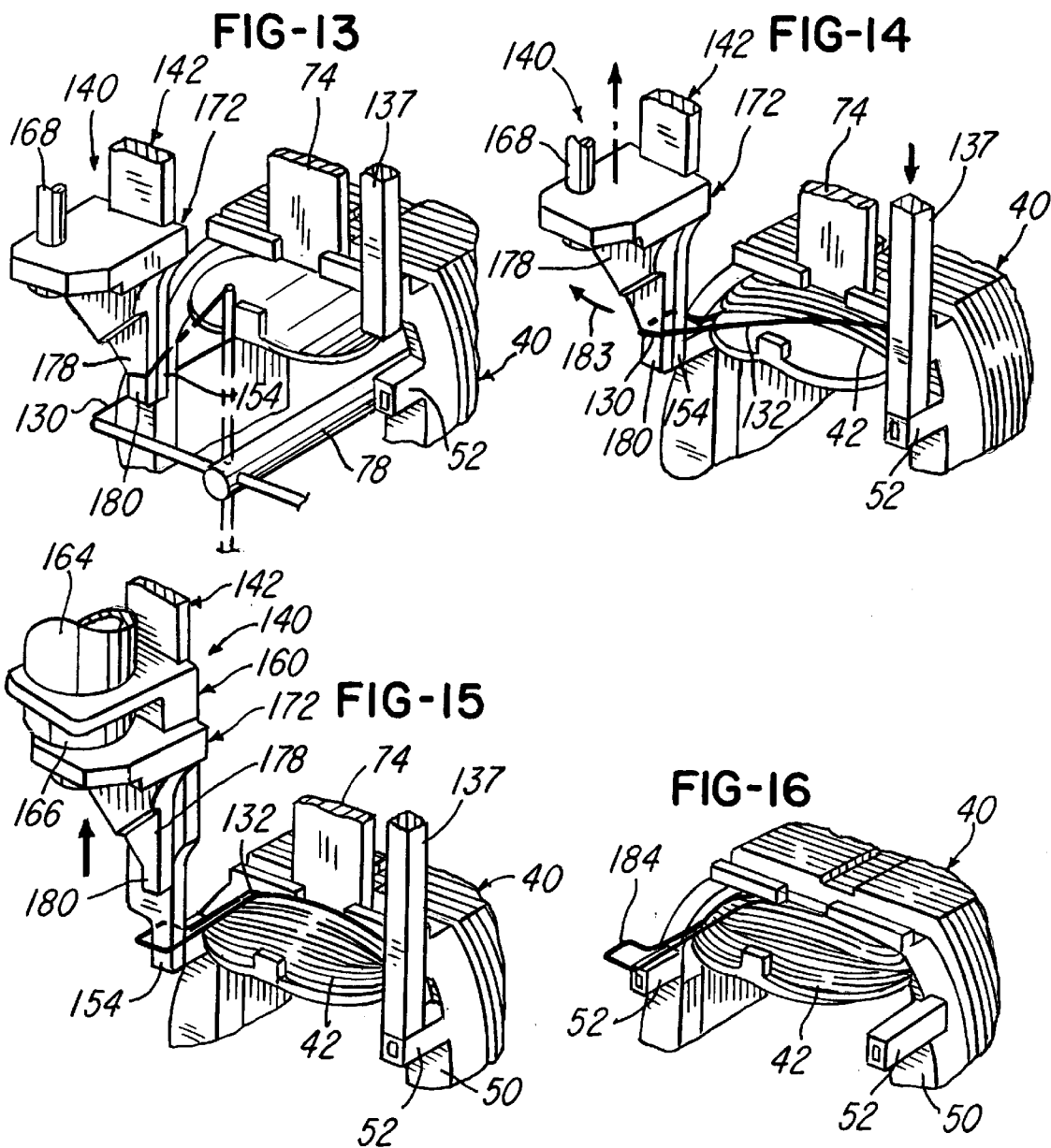

STATOR COIL WINDING AND LEAD WIRE PLACING METHOD AND APPARATUS

INCORPORATION BY REFERENCE

The disclosure of U.S. Pat. No. 5,090,108, granted Feb. 25, 1992, to Banner et al. is hereby incorporated by reference herein.

FIELD OF THE INVENTION

This invention relates to a stator coil winding and lead wire placing method and apparatus particularly intended for the manufacture of two-pole stators for universal electric motors. However, this invention may be useful for manufacturing other electrical devices.

BACKGROUND OF THE INVENTION

A conventional method of winding stators includes the steps of locating a stator at a stator coil winding station with its center axis aligned with the longitudinal axis of a wire winding ram or shuttle. Upper and lower pairs of winding forms are clamped to the stator to be wound and held in position by upper and lower pairs of form retainer plates. The above mentioned Banner et al. patent 5,090,108 discloses a stator coil winding station having upper and lower winding station tooling assembles 86 and 88 which include pairs of winding form retaining plates 74 and 76 used in conventional fashion to clamp winding forms in position to guide magnet wires exiting from the winding shuttle around pole pieces formed on the stator core.

The stator coils are simultaneously wound on the pole pieces by repeated reciprocal and oscillatory movements of the winding shuttle along and about its longitudinal axis to draw wires from sources of wire under tension, which wires exit through wire-exit needles at the end of the shuttle. Before and during the winding procedure, the bitter ends of the wires projecting from the winding shuttle are clamped by devices known as "lead pulls" which grip the finish wires at the end of the winding of one stator, cut the wire segments between the finish wire and the shuttle so that the newly-wound stator can be moved away from the winding station, and retain their grip on the freshly cut ends of the wire segments exiting from the shuttle while the next (unwound stator is moved into the winding station and at least during the initial part of the winding of the next stator. During the winding procedure, the wires exiting from the shuttle, guided by the winding forms, are wrapped around the stator pole pieces to form the stator coils as the shuttle repeatedly reciprocates through the bore of the stator and rotates adjacent each end of the stator.

The Banner et al. patent 5,090,108 also shows upper and lower start wire placing assemblies 140 and 142 used to hold the start wires away from the pole pieces during the winding of the coils. Start wire placing assemblies are used when there is a need or preference that the start wires not be wound under the subsequently wound turns of the stator coils. In the embodiment shown in the Banner et al. patent 5,090,108, each start wire placing assembly 140 and 142 includes a pair of start wire placing blades 144 and 146, one at each end of the stator, which are pivoted by operation of a single air actuator to move a start wire outwardly away from its associated pole piece.

It is not necessary that a single air actuator be used to drive the start wire placing blades at the opposite ends of the stator core. Other start wire placing assemblies have been used by which the two placing blades are separately driven by separate air actuators.

In operation, the placing blades are so located at the beginning of the winding operation that the start wires are extended outwardly of the placing blades when the winding shuttle first moves through the stator bore. When past the front face of the stator, the shuttle begins to rotate to carry the magnet wire across the front face of the pole piece. This also brings the start wires into engagement with the front placing blades. Operation of the shuttle is momentarily stopped at which time the placing blades are pivoted to move the start wires away from the pole pieces. Operation of the winding shuttle is then resumed and continues until the winding of the coils is completed. At the end of the winding operation, the start wire placing blades are moved away from the newly wound stator along with the form retaining plates, leaving behind loops in the start wires which are pulled out during subsequent manufacturing steps.

There are occasions in which, when a start wire is held away from its associated pole piece, the stretch or segment of wire extending from the start wire placing blade across the front end face of the pole piece can interfere with a desirable formation of the coil end turns extending along the front end of the stator. This occurs because that segment of wire may be quite taut and because it extends across the front end of the stator in the area in which the end turns build up as the winding progresses. In some cases, this problem has been alleviated by lowering the pressure on the air cylinder which holds the placing blades away from the pole piece, thereby permitting the front placing blade to move toward the stator pole piece and reducing the tension on the segment of wire that extends from the start wire across the front of the stator. However, the extent to which the placing blade may be moved is limited and it is not always possible to permit movement of the placing blade in this manner. Accordingly, there is a need to reduce or eliminate the interference with the proper formation of stator coil end turns by the segment of wire extending from an outwardly-placed start wire across the front end face of a stator being wound.

DEFINITIONS

The following terms used in the specification and claims are used in the senses indicated in this paragraph. The terms "upper," "lower," "vertical" and "horizontal" are used in a relative sense and not in an absolute sense. The term "front" in reference to the winding machine or the stator is used to refer to the parts of the machine and stator facing an observer standing in front of the winding shuttle during a winding operation. Accordingly, the term "rear" is used in the opposite sense. Thus, for example, at the outset of a winding operation, the winding shuttle moves from behind the rear end of the stator to the front end of the stator to extend the start wire through the bore of the stator. "Start wires" are the segments of the magnet wires extending from the lead pulls through the bore of the stator to form the first sides of the stator coils. The segment of wire that extends from the front wire placing blade across the front of a stator pole piece is referred to as the "first end turn." Because the first end turn merges with and extends from the start wire, the transitional wire segment at the front end of the start wire and the beginning of the first end turn are indistinguishable and is considered to be part of the start wire or part of the first end turn.

SUMMARY OF THE INVENTION

The primary object of this invention is to provide a method and an apparatus for reducing or eliminating the interference with the proper formation of stator coil end turns by the segment of wire extending from an outwardly-placed start wire across the front end face of a stator being wound.

In accordance with this invention, the first end turn is permitted to become slack by a method in which the first end turn is extended over a movable slack wire forming blade. When the slack wire forming blade is initially engaged with the first end turn, it pivots with the front placing blade to move the start wire away from the pole piece and increases the length of the first end turn. After the coil is partially wound, the slack wire forming blade is moved away from engagement with the first end turn so that the first end turn becomes slack and does not interfere with the formation of the stator coil.

Further in accordance with this invention, a start wire placing assembly is provided which includes, in addition to a start wire placing blade, a slack wire forming blade movable both with and relative to the wire placing blade. Preferably, an air actuator mounted on the wire placing blade drives the slack wire placing blade from an extended position in which it is located to be engaged by the first end turn to a retracted position out of engagement with the first end turn.

Other objects and advantages will become apparent from the following description and the drawings.

BRIEF DESCRIPTION OF THE DRAWINGS

FIG. 1 is a fragmentary front elevational view of a portion of a prior art stator coil winding and lead placing apparatus and a fragmentary end view of a stator wound thereby.

FIG. 2 is a fragmentary perspective view of a portion of the apparatus and the stator of FIG. 1 taken in the area indicated by line 2—2 of FIG. 1.

FIG. 3 is a fragmentary perspective view similar to FIG. 1 but showing a portion of a stator coil winding and lead placing assembly in accordance with this invention.

FIG. 4 is a fragmentary perspective view similar to FIG. 2 but showing the apparatus and a stator wound in accordance with this invention. FIG. 4 is taken in the area indicated by line 4—4 of FIG. 3.

FIG. 5 is an exploded perspective view of the lead placing assembly of FIG. 3.

FIG. 6 is a fragmentary cross-sectional view of the apparatus of FIG. 3, taken along line 6—6 of FIG. 3.

FIG. 7 is a diagrammatic plan view of a stator being wound and illustrating an initial stage in the operation of the apparatus of this invention.

FIGS. 8 through 12 are fragmentary diagrammatic plan views showing, in a continuing sequence, the operation of the apparatus of this invention.

FIG. 13 is a fragmentary perspective view of a stator being wound and part of the apparatus of FIG. 3 and illustrates the same winding stage diagrammatically illustrated in FIG. 7.

FIG. 14 is a view similar to FIG. 13 and illustrates the same winding stage diagrammatically illustrated in FIG. 9.

FIG. 15 is a view similar to FIG. 13 and illustrates a winding stage intermediate the stages diagrammatically illustrated in FIGS. 10 and 11.

FIG. 16 is a view similar to FIG. 13 and illustrates the same winding stage diagrammatically illustrated in FIG. 12.

DETAILED DESCRIPTION

With reference to FIGS. 1 and 2, this invention is shown in connection with the winding of a two-pole stator, generally designated 40, comprising a pair of field coils 42, only one of which can be seen in the drawings, wound on pole pieces formed by a laminated stator core 46. The end face, designated 48, of the stator 40 which is visible in FIG. 2 is formed from a plastic end plate or terminal mounting plate 50 having terminal-receiving sockets 52. Although not illustrated in the drawings, the stator 40 is supported by a suitable support or nest in a winding station, which is the station shown in FIGS. 1 and 2, with its center axis aligned with the longitudinal axis of a wire winding ram or shuttle 78 having wire exit needles 80. In this case, when an unwound stator arrives at the winding station, two pairs of winding forms (not shown) are assembled onto the stator, each winding form being clamped to the stator by one of four form retainer plates 74, only one of which can be seen in FIGS. 1 and 2. The retainer plates 74 are part of upper and lower winding station tooling assemblies, generally designated 86.

Here it may be observed that the stator 40 is essentially symmetrical about its horizontal axis and the lower tooling assembly (not shown) may essentially be a mirror image of the upper tooling assembly 86. To simplify the drawings and this description, only the upper portion of the stator 40 is illustrated as is only the upper tooling assemblies herein, it being well understood in the art that the upper and lower tooling assemblies normally function simultaneously in the same manner.

Up to this point in the description of FIGS. 1 and 2, the parts have been designated by reference numbers which are much the same as the reference numbers used for the corresponding parts shown in the Banner et al. patent 5,090,108. The tooling assembly 86 of the prior art shown in FIGS. 1 and 2 differs from that shown in the Banner et al. '108 patent so that parts first described below will not be designated by reference numbers corresponding to those of the '108 patent.

With continued reference to FIGS. 1 and 2, the form retainer plate 74 is nested within a stator locator plate 100 and guided between two vertically-extending guide plates 102. As described in the Banner et al. patent 5,090,108, the retainer plate 74 is vertically driven by an air actuator (not shown herein) to enable winding forms (not shown herein) to be locked by the retainer plate 74 to the stator. The retainer plate is shown in FIG. 1 in the position it occupies when locking a winding form to the stator.

A backing plate 104 connected to and movable with the form retainer plate 74 partly overlies the form retainer plate 74 and a placing blade support bracket 106 is connected to the backing plate 104 by screws 108 and 110. Screw 110 also extends into the form retainer plate 74. A front start wire placing blade 112 is pivotally suspended from the bracket 106 and has a lower tip 114 shaped to engage and move start wires at the beginning of a stator winding operation. Pivotal movements of the front placing blade 112 are obtained by operation of placing blade air actuator 116 which is connected to the form retainer plate 74 by an overhead bracket (not shown). Air actuator 116 has a piston rod 118 connected by a clevis 120 to a drive link 122 pivotally mounted on a bracket 124 mounted on the form retaining plate 74. Drive link 122 has a drive pin 126 that extends through an angled slot 128 that extends through the front placing blade 112 intermediate its upper and lower ends and is held therein by a locking collar 129. As is apparent, retraction of the piston rod 118 from the position shown in FIG. 1 will cause a pivotal movement of the placing blade 112 in a counter-clockwise direction as viewed in FIG. 1, to bring its lower tip 114 closer to the stator pole piece about which the upper coil 42 is wound.

In FIGS. 1 and 2, the front start wire placing blade 112 is shown pivoted to move the start wire, designated 130, away from the pole piece. At the same time, a rear start wire placing blade (not shown) could also be pivoted for the same purpose. The rear placing blade and the manner in which it is pivoted form no part of the present invention and are not further described herein.

With reference to FIG. 2, the start wire 130 is shown engaged along the outer side and the front of the placing blade tip 114. A first end turn 132 which merges with the start wire 130, extends from the front placing blade 112 across the front of the stator and enters the bore of the stator on the side opposite the front start wire placing blade 112. When winding the stator shown in FIG. 2, the front end turns, designated 134, formed after the first end turn 132 build up to such an extent that they engage the first end turn 132, which can become quite taut, and interfere with the proper layering of the subsequently-wound end turns. In FIG. 2, it will be noted that a void or pocket 136 is formed on the outermost parts of the coil 42 because the first end turn 132 interferes with the even build-up of the subsequently-wound end turns. The uneven build-up of the end turns causes the finished coil end to extend further from the horizontal center of the stator than may be acceptable and could adversely affect the electrical characteristics of the stator.

In the prior art represented by FIGS. 1 and 2, a wire deflector blade 137 extends downwardly from the clevis 120 to the top of the right side terminal-receiving socket 52 to prevent the magnet wire from accidentally catching on the socket during the winding operation.

The problems created by an outwardly-held first end turn 132 have been alleviated in some cases by lowering the pressure on the air actuator 116 which holds the placing blades away from the pole piece, thereby permitting the front placing blade tip 114 to move toward the stator pole piece and reduce the tension on the first end turn 132. However, the extent to which the placing blade tip 114 may be so moved is limited and it is not always possible to permit movement of the placing blade 112 in this manner. Accordingly, there is a need, which is satisfied by the invention described below, to reduce or eliminate the interference with the proper formation of stator coil end turns by the outwardly-held first end turn 132.

With reference to FIGS. 3 through 6, the presently preferred embodiment of this invention utilizes a tooling assembly 138 constructed identically to the tooling assembly 86 except that the front start wire placing blade 112 is replaced by a front start wire placing blade assembly, generally designated 140. Parts which may be identical to the prior art shown in FIGS. 1 and 2 are designated by the same reference numbers in FIGS. 3 through 6.

As best shown in FIGS. 5 and 6, the start wire placing blade assembly 140 comprises a front start wire placing blade 142 and a slack wire forming assembly, general designated 143, connected to the wire placing blade 142. The wire placing blade 142 could be constructed substantially identically to the wire placing blade 112, but is shown to include upper and lower relatively offset parts 144 and 146 connected by a central block portion 148. The upper part 144 has an angled slot 150 which serves the same purpose as the angled slot 128 described above. It also has a hole 152 at its upper end for mounting the blade 142 on the mounting bracket 106. The lower end of the placing blade 142 is provided with a wire-engaging tip 154 which may be identical to the prior art wire placing tip 114. In addition, the central block portion 148 has a through bore 156 that receives a mounting screw 158 for mounting the slack wire forming assembly on the wire placing blade 142 as described below.

The slack wire forming assembly 143 comprises an L-shaped mounting piece 160, the shorter leg of which has a rear face with a vertical channel 162 that snugly receives the front part of the central block portion 148 of the placing blade 142 to which it is connected by the mounting screw 158. The longer leg of the mounting piece 160 extends horizontally and provides support for a slack wire air actuator 164. The threaded nose of the air actuator 164 extends through an aperture in the longer, horizontal leg of the mounting piece 160 and is held in a fixed position thereon by a jam nut 166.

Air actuator 164 has a piston rod 168 threadedly engaged in a tapped hole 170 in the horizontal leg of a generally L-shaped slack wire-forming slide 172. A jam nut 174 is engaged with the free end of the piston rod 168 and is used to maintain close adjustments of the positions of the slack wire-forming slide 172.

The vertical leg of the slide 172 has a channel 176 for enabling the slide 172 to slide up and down on the wire placing blade 142 when driven by operation of the slack wire air actuator 164. The vertical leg of the slide 172 terminates at its lower end in a slack wire forming blade 178 having a downwardly projecting tip 180.

With reference to FIGS. 7 through 16, the apparatus of this invention operates in the following manner. In FIG. 7, the bitter end of the start wire 130 is shown clamped by a lead pull 182 and the shuttle 78 has been advanced from the rear of the stator to the front of the stator so that the start wire 130 extends through the stator bore and outside the tips 154 and 180 which, at this time are side-by-side and at the same vertical level. When the shuttle 78 begins to rotate as shown in FIG. 8 and by phantom lines in FIG. 13, the start wire 130 is brought into engagement with both of the tips 154 and 180. At this time, the operation of the shuttle 78 is temporarily interrupted and the entire wire placing blade assembly 140 is pivoted in the direction indicated by the arrow 183 in FIGS. 8 and 14 by operation of the placing blade air actuator 116 to move the start wire 130 away from the pole piece and also to increase the length of the first end turn 132.

After the placing blade assembly 140 is pivoted as shown in FIG. 8, operation of the shuttle 78 is resumed to wind several turns of the coil 42 as shown in FIGS. 9 and 14. At this time, the slack wire forming slide 172 is raised by operation of the air actuator 164 to move the slack wire forming tip 180 out of engagement with the start wire 130. Accordingly, the first end turn 132 becomes slack as diagrammatically shown in FIG. 10. As the winding of the stator continues, the slack first end turn 132 is able to accommodate to the build-up of the coil end turns. At least in some cases, the slack end turn 132 is pushed by the subsequently wound end turns against the front face of the stator as shown in FIGS. 4, 11 and 15. After the winding of the coil 42 is completed in accordance with this invention, and as shown in FIGS. 3, 4, 11 and 15, the coil is properly shaped without the void or pocket 136 evident in the prior art. The form retaining plate 74 may be lowered slightly to unlock the winding forms, thereby permitting removal of the winding forms. Thereafter, the form retaining plate 74 can be raised. The start wire placing blade assembly 140 is, of course, raised along with the form retaining plate 74, leaving only the loop of wire, designated 184, shown in FIGS. 12 and 16, formed around the front placing blade tip 154. Thereafter, as explained in the Banner et al. patent 5,090, 108, the wire loop 184 is removed as the start wire is pulled away from the rear face of the stator as indicated by the arrow 186 in FIG. 12.

The slack wire forming plate 178 can be retracted at any time during the winding of the stator coil before the completion of the coil. The optimum time to retract the forming plate would be just before the coil end turns build up to the point that the unslackened first end turn begins to interfere with the proper layering of the subsequently-wound end turns.

As will be apparent, the slack wire forming tip 180 could be sized or located such that the start wire 130 does not engage the front start wire placing blade tip 154 until after the slack wire forming blade 178 is retracted away from engagement with the first end turn 132.

It will be appreciated that conventional machine controls may be used to control the operations of the air actuators and other parts of the machine described herein. Such controls could take many forms, none of which are germane to the instant invention and are, therefore, not described herein.

A modification that will be evident to those familiar with the art of stator winding is that this invention may be used with so-called formless winding, which does not use winding forms and, therefore, does not include form retaining plates. In such cases, a vertically movable plate such as the form retainer plate 74 without the lower form retaining section could be used to support and vertically move the start wire placing assembly.

Although the presently preferred embodiments of this invention have been described, it will be understood that within the purview of the invention various changes may be made within the scope of the following claims.

Having thus described my invention, I claim:

1. In a method of winding a stator wherein a coil of wire is wound around a pole piece by a reciprocating and oscillating winding shuttle, the coil having a start wire extended around a start wire placing blade at the beginning of the winding of the coil, the start wire merging into a first end turn which extends across the pole piece, the steps comprising:

providing a slack wire forming blade;

extending the first end turn partly around the slack wire forming blade to increase the length of the first end turn;

partly winding the coil;

retracting the slack wire forming blade out of engagement with the first end turn so that the first end turn becomes slack; and completing the winding of the coil.

2. The method of claim 1 further comprising the steps of:

providing a wire placing blade;

mounting said slack wire forming blade for movement relative to said wire placing blade;

wherein said step of extending the first end turn partly around the slack wire forming blade includes partly extending the first end turn around said wire placing blade;

wherein said retracting step comprises moving the slack wire forming blade relative to the wire placing blade, the first end turn remaining extended partly around the placing blade; and, after the completion of the winding of the coil, retracting the wire placing blade.

3. The method of claim 1 wherein retracting step is accomplished by operation of an air actuator mounted on said wire placing blade.

4. The method of claim 1 wherein retracting step is accomplished by sliding said forming blade along said placing blade.

5. In a stator winding machine having a reciprocating and oscillating coil winding shuttle for winding a coil of wire around a pole piece of a stator aligned therewith, said coil having a start wire which merges into a first end turn that spans across the pole piece, said machine having a start wire-placing assembly for moving the start wire of a stator coil being wound away from the pole piece around which the coil is wound in order to form a loop of wire which is pulled out when the start wire is connected to a terminal during a later stage of manufacture of the stator, the improvement wherein said start wire-placing assembly comprises a start wire placing blade pivotally positioned to be engaged by the start wire and to move the start wire away from the pole piece and further comprises a first end turn slack forming apparatus comprising a slack wire forming blade having wire-engaging surfaces and movable from a first position in which said start wire-engaging surfaces are engaged by the first end turn of the coil being wound, a second position in which said slack wire forming blade is moved away from the stator pole piece to increase the length of the first end turn, and a third position in which said slack wire forming blade is retracted away from the first end turn so that the first end turn becomes slack.

6. The apparatus of claim 5 wherein said slack wire forming blade is mounted for sliding movement on said wire placing blade.

7. The apparatus of claim 6 further comprising an air actuator mounted on said slack wire placing blade and connected to said wire forming blade for causing relative movement between said forming blade and said placing blade.

\* \* \* \* \*